April 21, 1953  C. L. SEEFLUTH ET AL  2,635,631
PILOT VALVE CONTROLLED MOTOR VALVE
Filed March 29, 1949  2 SHEETS—SHEET 1

INVENTORS
C. L. SEEFLUTH
T. A. ST. CLAIR
BY Hudson & Young
ATTORNEYS

April 21, 1953     C. L. SEEFLUTH ET AL     2,635,631
PILOT VALVE CONTROLLED MOTOR VALVE Filed March 29, 1949     2 SHEETS—SHEET 2

INVENTORS
C. L. SEEFLUTH
T. A. ST. CLAIR
BY *Hudson & Young*
ATTORNEYS

Patented Apr. 21, 1953

2,635,631

UNITED STATES PATENT OFFICE 2,635,631

PILOT VALVE CONTROLLED MOTOR VALVE

Charles L. Seefluth, Bartlesville, Okla., and Theodore A. St. Clair, Pontiac, Mich., assignors to Phillips Petroleum Company, a corporation of Delaware Application March 29, 1949, Serial No. 84,114

2 Claims. (Cl. 137—553)

This invention relates to pilot valve controlled motor valves. In one specific aspect it relates to such valves when used in the general combination shown in application Serial No. 784,673 filed November 5, 1947, by Charles L. Seefluth, one of the present inventors, in which the pilot operated motor valve 15 is used to control the supply of liquid flowing through pipes 24 and 26 so that a cylinder (not shown) placed on platform scales 3 will receive an automatically controlled uniform amount of said liquid. In another specific aspect the invention relates to a pilot valve controlled motor valve in which the pilot valve is easily operated by relatively small axial movements of a rod or other suitable engaging member.

In the art of valves there is considerable difficulty in getting a valve which will move through a relatively large distance to open wide and to tightly close a conduit containing liquid under considerable pressure, when the only control available for so operating the valve comprises a member having limited movement through a small distance. Such a problem exists in a combination shown in the above mentioned copending application, which application solves the problem to a large degree. The present application however provides an improved valve suitable for use in said combination and in all similar combinations where the present type of valve is particularly well adapted for use. One difficulty with the valves of the prior art was caused by leakage of the liquid being controlled into the pilot valve system, rendering the same inoperative, and also leakage of said liquid to the atmosphere. One of the preferred uses of the present valve is to control the flow of a volatile and inflammable liquid having a high vapor pressure, such as propane or butane, and it is obvious that care must be taken not to allow this liquid to enter the pilot valve system or to escape to the atmosphere. One object of the present invention is to provide an improved pilot operated motor valve.

Another object is to provide a simple and positive position indicating means for said valve.

Another object is to provide a pilot operated motor valve in which the fluids being controlled by the valve and the fluid operating the pilot valve are prevented from contacting each other in a positive manner.

Numerous other objects and advantages will be apparent to those skilled in the art upon reading the accompanying specification, claims and drawings.

Figure 1:
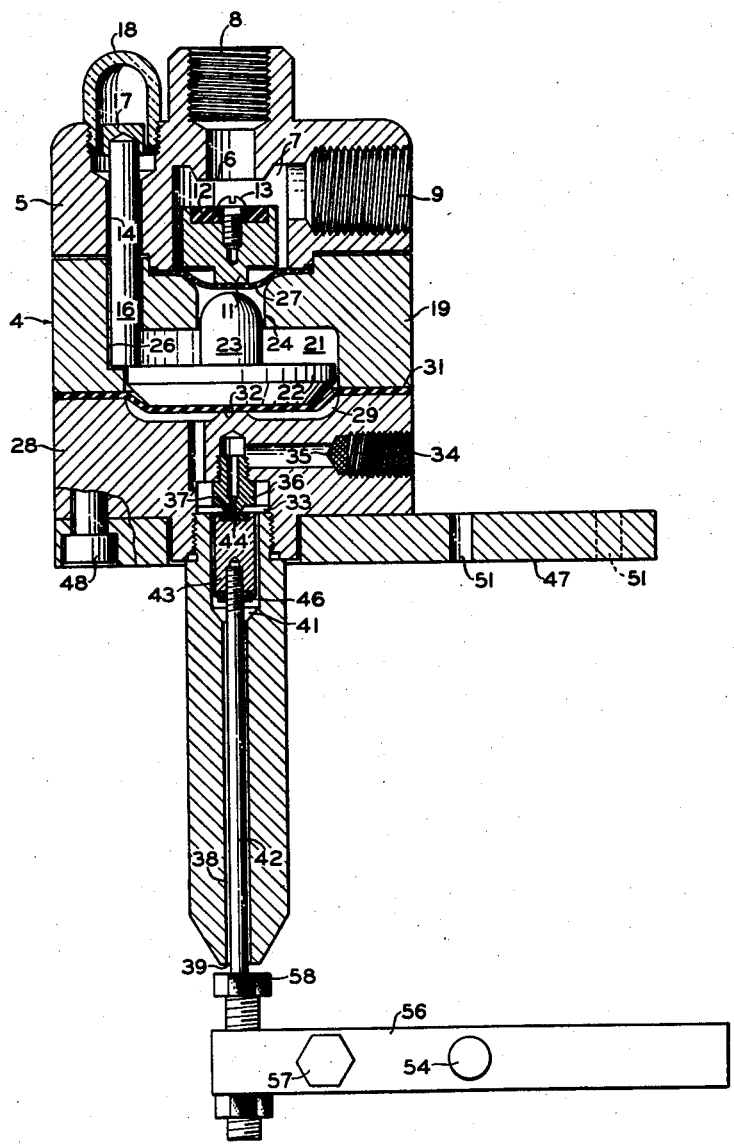
Figure 1 is a cross sectional elevational view of a valve embodying the present invention and is taken along the line 1—1 of Figure 2 looking in the direction indicated.

In Figure 1, the body of the pilot controlled motor valve (generally designated as 4), which embodies the present invention, is preferably formed in three sections. The upper section 5, also called the valve seat section because it contains valve seat 6, comprises a cylindrical body having a valve chamber 7 therein communicating with an inlet conduit 8 and an outlet conduit 9. While conduit 8 is preferably the inlet and conduit 9 is preferably the outlet, especially when handling liquified petroleum gases, such as propane and/or butane, even with these liquified gases, and with many other fluids, it is possible to operate the valve and obtain results of value when 9 is the inlet and 8 is the outlet. Positioned in chamber 7 is a floating valve head 11 which preferably is provided with a relatively soft resilient gasket 12 secured thereto by screw 13 and the sleeve shown surrounding the screw.

Upper body member 5 also contains a bore 14 for the retention of indicating rod 16 in reciprocating relation thereto. Rod 16 is provided with a cap 17 which is preferably made of a brightly colored plastic material of a color contrasting with body 5 in order that cap 17 may act as an indicator flag. In order that flag 17 may be visible and yet may be protected from contact with external objects or with dirt, we preferably cover the same with a translucent, but preferably transparent, dome 18 which may be made of glass, but which preferably is made of clear "Lucite" (a methyl methacrylate resin or other suitable plastic).

The central portion 19 of body 4 is provided with a central chamber 21 for the reception of a floating piston 22. The piston 22 is provided with an upper reduced diameter valve operating portion 23 which is received and guided by a reduced diameter portion 24 of chamber 21. A bore 26 forms a continuation of bore 14 and indicating rod 16 reciprocates in said bore 26 and rests on the top of piston 22. Obviously, therefore, the position of flag 17 indicates the position of piston 22 and in turn indicates the position of valve head 11.

Between central portion 19 and upper portion 5 of body 4 there is disposed an impervious flexible diaphragm 27. Operating portion 23 of piston 22 operates valve 11 through flexible diaphragm 27.

The lower portion 28 of housing 4 is also called the control valve housing, or pilot valve housing. It contains a chamber 29 which is a continuation of chamber 21 but which is separated therefrom by a lower impervious flexible diaphragm 31 held in place between body members 19 and 28. The wall of the chamber 29 is provided with an upstanding central boss 32 which prevents diaphragm 31 from becoming completely forced into contact with the walls of the chamber 29 and thereby allows fluid in chamber 29 to operate piston 22 rapidly and without fail.

It will be seen that impervious diaphragms 27 and 31 seal off chamber 21 from any fluids in chambers 7 and 29 respectively. Any gas leaking through said diaphragms into chamber 21 will obviously pass up the space shown in the drawings between rod 16 and the walls of passage 26 and out the space shown between body sections 5 and 19 into the atmosphere, so that chamber 21 is maintained at atmospheric pressure at all times, breathing through said spaces as diaphragm 31 rises and falls during operation of the device.

Lower body member 28 is also provided with a pilot valve chamber 33. Chamber 33 is provided with a supply of pressure fluid, preferably at a relatively constant pressure, through inlet conduit 34 (containing screen 35 if desired for the removal of dirt). Conduit 34 is restricted in passing through orifice 36 which orifice also has a lip 37 acting as one of the two pilot valve seats.

Chamber 33 is provided with an exhaust passage 38 leading to the atmosphere at 39 and this exhaust passage has a valve seat 41 formed therein. Loosely guided and reciprocating in the exhaust passage 38 is a pilot valve operating rod 42. Rod or stem 42 operates a valve head 43 which may be provided with a relatively soft resilient washer 44 for contact with seat 37 and a similar washer 46 for contact with seat 41. While in some instances some advantages are obtained by having rod 42 separate from head 43, in most instances it is preferred to have rod 42 screw into head 43 and at the same time retain washer 46 as shown.

In order to mount valve 4 on other objects a mounting base or bracket 47 may be provided which preferably is attached to the lower section 28 by means of screws 48. At the same time it is necessary to secure parts 5, 19 and 28 together and therefore it is preferable to have screws 48 also perform this function in the usual manner. Bracket 47 may be provided with holes 51 in order that it may be secured to other objects.

Figure 2:
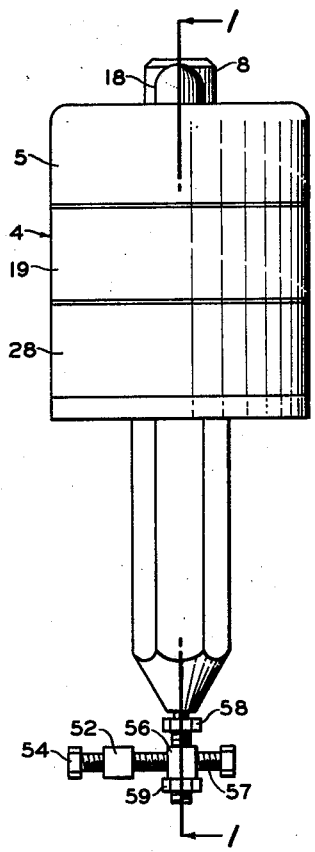
Figure 2 is an elevational end view of the left side of the device shown in Figure 1.
Figure 3:
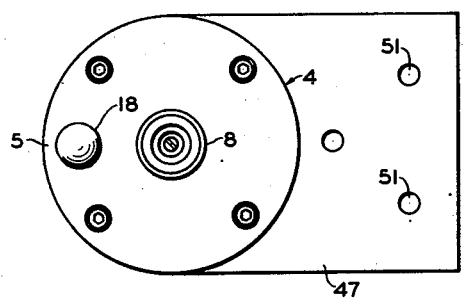
Figure 3 is a top view of the structure shown in Figures 1 and 2.

This completes a description of the valve. However, in order to show the environment further it may be stated that in one useful application of the valve brackets or stay bars 52 and 56 are secured to the beam of a scale such as beam 6 of application Serial No. 784,633 and moves with the change in weight on the scale platform 3 of said application. In the present application, bars 52 and 56 are secured to the scale beam (not shown) by any suitable means such as by friction when bolts 54 and 57 (see Figure 2) are tightened to clamp bars 52 and 56 to opposite sides of said scale beam. Vertical adjustment is provided by screw 58 threaded in bar 56 and locked into position by lock nut 59.

*Operation*

When the valve is in the open position as shown, screw 58 is supporting rod 42 which is in turn pressing valve head 43 against seat 37 and holding head 46 away from seat 41. Therefore, pilot pressure fluid coming in inlet 34 is stopped at seat 37. Fluid in chambers 29 and 33 flows out through seat 41 and passage 38 to the atmosphere at 39. The difference in pressure between inlet 8 and outlet 9, if 8 is the inlet instead of the outlet, which may be aided somewhat by gravity, moves valve 11 and piston 22 down into the position shown in Figure 1, valve 11 and piston 22 carrying flexible diaphragms 27 and 31 along with them. If 9 is the inlet and 8 the outlet, then valve 11 should be heavy enough to operate in spite of the pressure difference between 8 and 9. Because there are two impervious flexible diaphragms 27 and 31, it is impossible for the liquid in 7 to reach chamber 33. At the same time gravity causes rod 16 to follow piston 22 and lower flag 17. Valve 11 is in the open position and fluid flows from inlet 8 to outlet 9 (or if 9 is the inlet and 8 the outlet the liquid flows in the opposite direction). It is preferred to have 8 as the inlet and 9 as the outlet.

It will be noted that boss 32 is holding piston 22 and diaphragm 31 off of the floor of chamber 29. Therefore if bar 52 moves down a very small distance so that head 46 seats on seat 41, passage 38 will be closed and the pilot pressure fluid coming in inlet 34 passes through open valve seat 37 and chamber 33 up into chamber 29.

Chamber 29 is of considerably greater cross sectional area than chamber 7 so a smaller pressure on the fluid in 29 will operate against a larger pressure in chamber 7. The fluid from 34 enters chamber 29 pushing diaphragm 31, piston 22, operator 23, diaphragm 27 and valve head 11 up a much greater distance than head 43 moved so that head 11 secures seat 6 closing the valve and preventing flow from conduit 8 to conduit 9 or vice versa. At the same time piston 22 has carried rod 42 upwardly so that contrasting colored flag 17 is visible in dome 18. This is the closed position of the valve.

While we have described a particular embodiment of this valve for purposes of illustration it should be understood that the scope of the invention is set forth in the following claims.

Having described our invention, we claim:

1. A motor valve comprising in combination a body having a first and second chamber therein and a passage therein smaller in cross-sectional area than either chamber connecting said chambers, said second chamber being of greater cross-sectional area than said first chamber, said first chamber having an inlet and an outlet conduit connected thereto, a valve seat around one of said conduits and a valve movable in said first chamber to close said valve seat and stop flow through said conduits thereby, a flexible impervious diaphragm of greater cross-sectional area than said first chamber dividing said second chamber into a first and second section, means for supplying pressure fluid to said first section so that said diaphragm acts as a motor, a member movably disposed in said second section in contact with said diaphragm having a portion movable in said passage in operative engagement with said valve to move said valve to said seat, means sealing off said second chamber from flow of fluid from said first chamber through said passage, and a vent conduit venting said first section to the atmosphere.

2. In the combination of claim 1, said body having a transparent dome communicating with said second section, and a signal rod freely and loosely disposed in said second section freely riding on said member and disposed to move up into said dome free from restraint caused by any sliding fit when said member moves said valve to close said seat.

CHARLES L. SEEFLUTH.
    THEODORE A. ST. CLAIR.

References Cited in the file of this patent

UNITED STATES PATENTS

| Number | Name | Date |
|---|---|---|
| 522,995 | Maxim | July 17, 1894 |
| 1,029,600 | Foster | June 18, 1912 |
| 1,110,137 | Johnson | Sept. 8, 1914 |
| 1,267,231 | Kerndl | May 21, 1918 |
| 1,585,479 | Fisher | May 18, 1926 |
| 1,648,710 | Wright | Nov. 8, 1927 |
| 1,871,044 | Crosthwait | Aug. 9, 1932 |

FOREIGN PATENTS

| Number | Country | Date |
|---|---|---|
| 29,682 | Germany | of 1884 |
| 813,841 | France | Mar. 8, 1937 |